(12) United States Patent
Bauer et al.

(10) Patent No.: US 6,910,562 B2
(45) Date of Patent: Jun. 28, 2005

(54) TORSIONAL-VIBRATION DAMPER

(75) Inventors: Karl-Heinz Bauer, Taunusstrasse (DE); Michael Schäfer, Mannheimer (DE); Hans Jürgen Hauck, Auguastastrasse (DE); Johannes Heinrich, Frankfurter Hohl (DE)

(73) Assignee: BorgWarner, Inc., Auburn Hills, MI (US)

( * ) Notice: Subject to any disclaimer, the term of this patent is extended or adjusted under 35 U.S.C. 154(b) by 48 days.

(21) Appl. No.: 10/461,086

(22) Filed: Jun. 13, 2003

(65) Prior Publication Data

US 2004/0016317 A1 Jan. 29, 2004

(30) Foreign Application Priority Data

Jun. 15, 2002 (EP) .............................................. 02013204

(51) Int. Cl.$^7$ .............................. F16D 3/14; F16D 3/66
(52) U.S. Cl. ................................... 192/70.17; 192/214.1
(58) Field of Search ........................... 192/55.61, 70.17, 192/214.1

(56) References Cited

U.S. PATENT DOCUMENTS

| | | |
|---|---|---|
| 1,591,063 A | 7/1926 | Smith |
| 1,991,709 A | 2/1935 | Spase |
| 3,059,740 A | 10/1962 | Roche ....................... 192/3.28 |
| 3,612,237 A | 10/1971 | Honda ......................... 192/109 |
| 3,804,219 A | 4/1974 | Cummings, III ............. 192/82 |
| 3,834,503 A | 9/1974 | Mauer et al. ................ 192/113 |
| 4,205,739 A | 6/1980 | Shelby et al. ............... 192/113 |
| 4,240,532 A | 12/1980 | Blomquist .................. 192/3.28 |
| 4,270,647 A | 6/1981 | Leber .......................... 192/113 |
| 4,289,048 A | 9/1981 | Mikel et al. ................... 74/733 |
| 4,295,348 A | 10/1981 | Helfer et al. ................... 64/27 |
| 4,372,434 A | 2/1983 | Aschauer ....................... 192/85 |
| 4,437,551 A | 3/1984 | Gimmler et al. ........... 192/3.28 |
| 4,638,897 A | 1/1987 | Nishimura .................... 192/3.3 |
| 4,640,402 A | * 2/1987 | Hartig et al. ............... 192/202 |
| 4,646,886 A | 3/1987 | Nishimura ................. 192/3.28 |
| 4,667,798 A | 5/1987 | Sailer et al. ............. 192/70.12 |
| 4,715,485 A | * 12/1987 | Rostin et al. ............... 192/202 |
| 4,813,524 A | 3/1989 | Reik ........................ 192/106.2 |
| 4,827,784 A | 5/1989 | Muller et al. .................. 74/330 |

(Continued)

FOREIGN PATENT DOCUMENTS

| | | |
|---|---|---|
| DE | 31 18565 A1 | 11/1982 |
| DE | 3801 348 A1 | 8/1988 |
| DE | 197 51 029 A1 | 5/1998 |
| DE | 100 37 646 A1 | 2/2002 |
| EP | 0 216 476 A1 | 4/1987 |
| EP | 0 555 643 A1 | 1/1993 |
| EP | 0 826 899 A2 | 3/1998 |
| GB | 2 251 041 A1 | 6/1992 |
| GB | 2 297 602 A | 8/1996 |
| JP | 11218190 A  *  8/1999 | ........... F16F/15/139 |

Primary Examiner—Richard M. Lorence
(74) Attorney, Agent, or Firm—Bliss McGlynn, P.C.; Greg Dziegielewski

(57) ABSTRACT

A torsional-vibration damper includes at least one primary element and a secondary element that can be coupled to each other by a spring device, are limited in movement in relation to each other about a rotational axis, and can be brought into frictional contact with each other by a friction device. The friction device has at least two friction-surface-carrying elements rubbing against each other to which a contact-pressure force, generated by a force-generating device, can be applied to produce a frictional engagement between the two elements. The force-generating device has a mechanical actuating mechanism for generating an actuating force and a hydraulic actuating mechanism for generating a counterforce, wherein the contact-pressure force is a vector sum of the actuating force and the counterforce.

17 Claims, 6 Drawing Sheets

U.S. PATENT DOCUMENTS

| | | | |
|---|---|---|---|
| 4,884,996 A | 12/1989 | Schmitt et al. | 464/68 |
| 4,895,232 A | 1/1990 | Kobayashi | 192/3.3 |
| 4,909,362 A | 3/1990 | Miura et al. | 192/3.28 |
| 4,926,988 A | 5/1990 | Kundermann | 192/3.3 |
| 4,987,981 A | 1/1991 | Casse et al. | 192/3.29 |
| 4,991,704 A * | 2/1991 | Flotow | 192/202 |
| 5,070,974 A | 12/1991 | Kirkwood | 192/3.3 |
| 5,174,420 A | 12/1992 | DeWald et al. | 188/264 |
| 5,305,863 A | 4/1994 | Gooch et al. | 192/70.12 |
| 5,462,145 A | 10/1995 | Gimmler | 192/3.29 |
| 5,466,195 A | 11/1995 | Nogle et al. | 475/55 |
| 5,469,943 A | 11/1995 | Hill et al. | 188/264 |
| 5,477,950 A | 12/1995 | Maloof | 192/3.29 |
| 5,495,927 A | 3/1996 | Samie et al. | 192/70.12 |
| 5,538,121 A | 7/1996 | Hering | 192/70.12 |
| 5,553,693 A | 9/1996 | Schoder et al. | 192/3.29 |
| 5,577,588 A | 11/1996 | Raszkowski | 192/133.35 |
| 5,603,660 A | 2/1997 | Kyle | 464/68 |
| 5,613,588 A | 3/1997 | Vu | 192/113.35 |
| 5,655,635 A | 8/1997 | Yuergens et al. | 192/3.29 |
| 5,660,258 A | 8/1997 | Bacon et al. | 192/3.29 |
| 5,755,314 A | 5/1998 | Kanda et al. | 192/70.12 |
| 5,771,691 A | 6/1998 | Kirkwood et al. | 60/345 |
| 5,935,007 A | 8/1999 | Yang | 464/24 |
| 6,244,407 B1 | 6/2001 | Kremer et al. | 192/70.12 |
| 6,371,857 B1 | 4/2002 | Kono et al. | 464/68 |
| 2002/0011391 A1 * | 1/2002 | Kroll et al. | 192/202 |

* cited by examiner

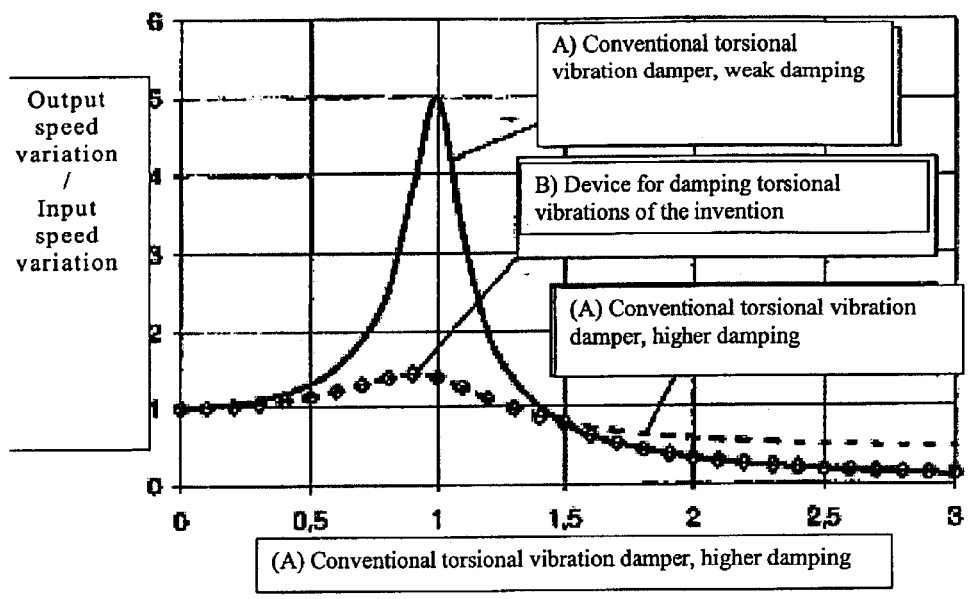
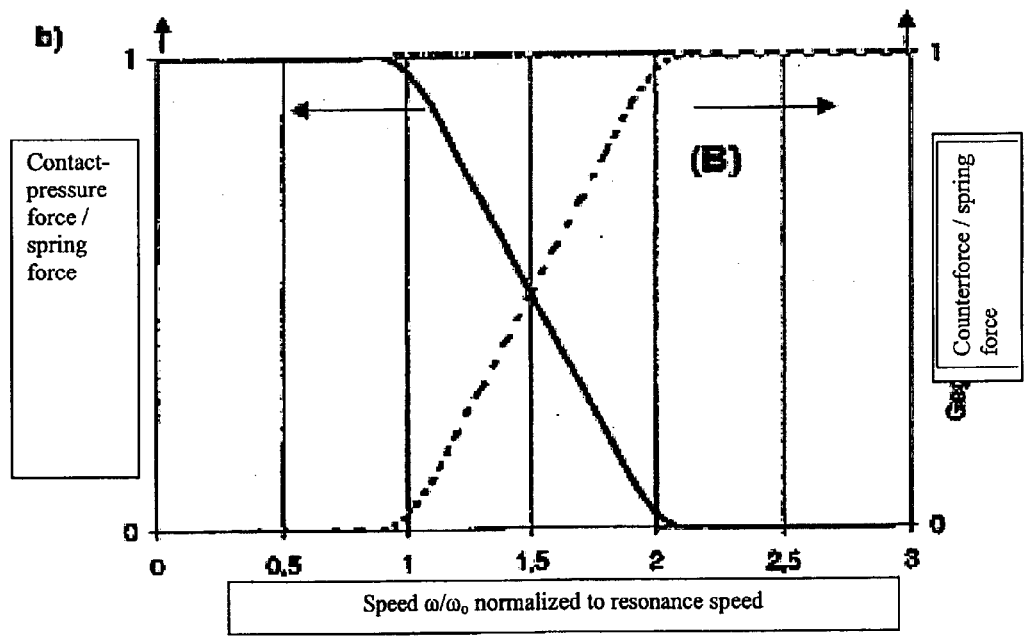
Fig. 4

TORSIONAL-VIBRATION DAMPER

BACKGROUND OF THE INVENTION

1. Field of the Invention

The present invention relates, generally, to a motor vehicle and, particularly, to a torsional-vibration damper of the vehicle.

2. Description of the Related Art

A torsional-vibration damper is, generally, a type of elastic coupling disposed between two components of a drive train of a vehicle, for example, between an internal-combustion engine and a transmission. Such devices prevent vibrations from being transmitted from the engine to other parts of the drive train.

The basic embodiment of a torsional-vibration damper includes a primary element and a secondary element that can be coupled to each other by a spring device and are limited in movement in relation to each other about a rotational axis. The spring device advantageously includes a plurality of springs disposed on a radial arc spaced relative to the rotational axis and, preferably, at a certain uniform distance from each other. The springs, or a sequence of multiple springs, if applicable, are then connected to the primary element on one side of the springs and to the secondary element on the other side of the springs. Torque is transmitted through the spring coupling, and, as a result of the spring characteristic, a certain additional damping effect is achieved.

When torsional-vibration dampers are used in the drive train, however, it is necessary to have a high moment of friction in the drive train to decrease the vibration amplitudes in the resonance range. Unfortunately, this causes the transmission characteristic to deteriorate in higher speed range.

This problem is addressed in published German patent application DE 100 37 646 A1 ('646 A1 application). This application discloses an embodiment of a torsional-vibration damper having primary and secondary elements that are coupled not only by the spring device, but additionally via a friction device whose damping effect can be controlled and adjusted by a special force-generating device. The friction device can also be engaged and disengaged in the manner of a clutch.

Although the torsional-vibration damper disclosed in the '646 A1 application is basically effective in solving this problem, it suffers from the disadvantage that the control system used for providing a controlled moment of friction in the friction device is generally too expensive. Therefore, the manufacturing costs of the overall arrangement of the embodiment are considered too high for many applications.

Thus, there remains a need in the art for a torsional-vibration damper having a control system for providing a controlled moment of friction in the friction device that is not too expensive. In particular, there remains a need in the art for a control system for the damping effect of the friction device that can be produced cost-effectively.

SUMMARY OF THE INVENTION

The present invention overcomes the disadvantages in the related art in a torsional-vibration damper including at least one primary element and a secondary element that can be coupled to each other by a spring device, are limited in movement in relation to each other about a rotational axis, and can be brought into frictional contact with each other by a friction device. The friction device has at least two elements rubbing against each other to which a contact-pressure force, generated by a force-generating device, can be applied to produce a frictional engagement between the two elements. The force-generating device has a mechanical actuating mechanism for generating an actuating force and a hydraulic actuating mechanism for generating a counterforce, wherein the contact-pressure force is a vector sum of the actuating force and the counterforce.

One advantage of the torsional-vibration damper of the present invention is that the control system thereof for providing a controlled moment of friction in the friction device is not too expensive.

Another advantage of the torsional-vibration damper of the present invention is that the control system can be produced cost-effectively.

Another advantage of the torsional-vibration damper of the present invention is that variability of the damping effect of the frictional contact is achieved.

Another advantage of the torsional-vibration damper of the present invention is that the control system for controlling and adjusting the frictional engagement of the two elements rubbing against each other is a simpler arrangement.

Another advantage of the torsional-vibration damper of the present invention is that the damping effect of the friction device is easily controllable.

Another advantage of the torsional-vibration damper of the present invention is that no additional pressure-medium-supplying devices are needed.

Another advantage of the torsional-vibration damper of the present invention is that it requires few separate components.

Other objects, features, and advantages of the present invention will be readily appreciated as the same becomes better understood while reading the subsequent description taken in conjunction with the accompanying drawings.

BRIEF DESCRIPTION OF THE DRAWINGS

FIG. 4a is a graph of speed-related damping behavior of a first embodiment of a torsional-vibration damper of the present invention as shown in FIG. 1 illustrating normalized vibration amplitude in dependence of normalized speed.

FIG. 4b is a graph of speed-related damping behavior of a first embodiment of a torsional-vibration damper of the present invention as shown in FIG. 1 illustrating normalized actuating forces on a friction device of the torsional-vibration damper in dependence of normalized speed.

DETAILED DESCRIPTION OF THE INVENTION

Figure 1:
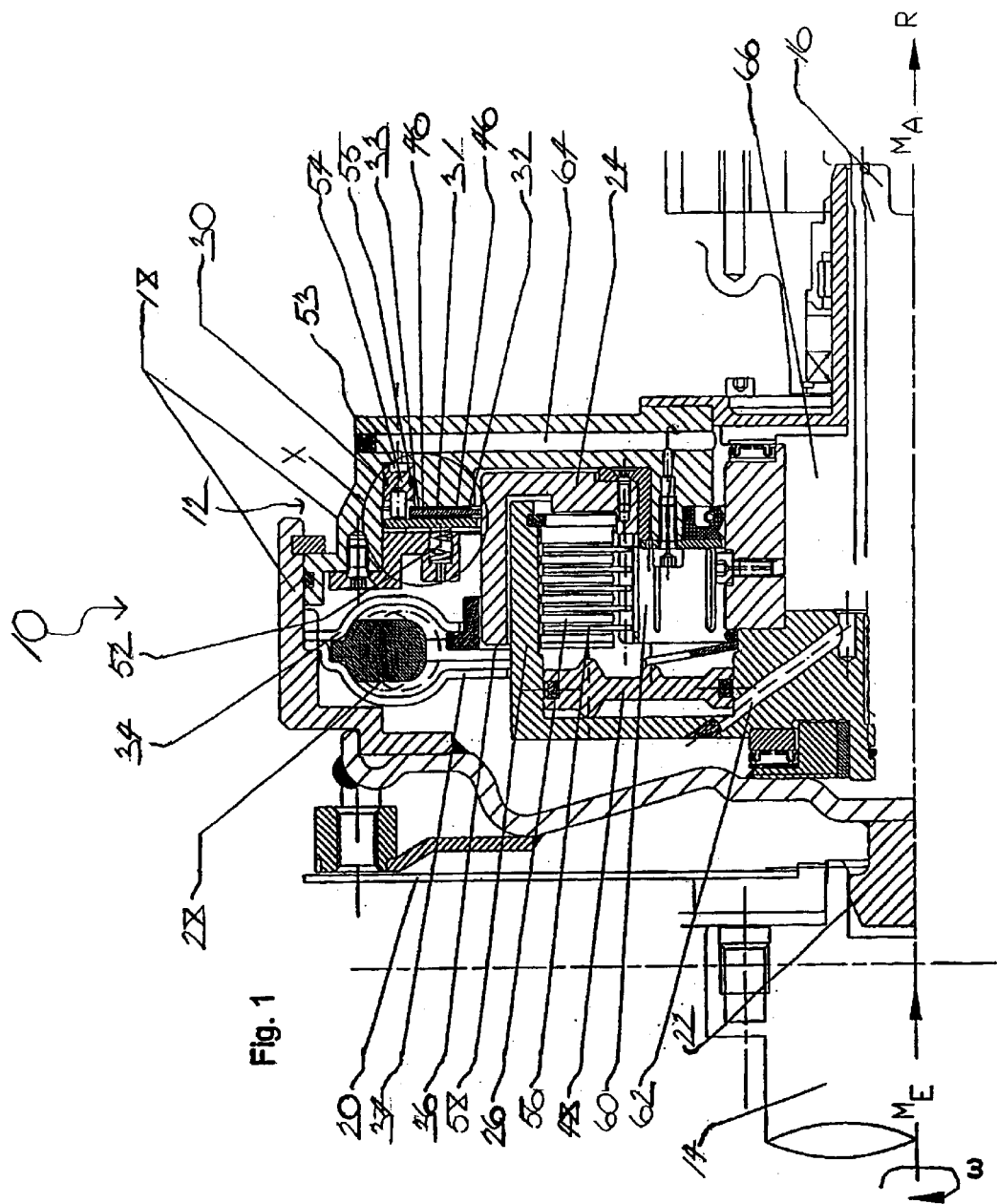
FIG. 1 is an axial profile of a section of a first exemplary drivetrain of a motor vehicle showing a first embodiment of a torsional-vibration damper of the present invention.

Referring now to FIGS. 1 through 4b, where like numerals are used to designate like structure, a section of a first exemplary drivetrain of a motor vehicle is generally indicated at 10 in FIG. 1 and illustrates a possible basic structure and functional method of a first embodiment of the torsional-vibration damper of the present invention, generally indicated at 12. In general, a flange 14—coupled to, for example, an internal-combustion engine, a motor, or the like—represents the driving side of the drive train 10. A shaft 16—coupled to, for example, a transmission (not shown) or the like—represents the power-take-off side of the drive train 10. The torsional-vibration damper 12 is disposed between the driving side and the power-take-off side and, thus, the flange 14 and the shaft 16. Consequently, a torque "$M_E$" introduced on the driving side by rotational speed "$\omega$" via the flange 14 can be transmitted via the torsional-vibration damper 12 to the shaft 16 and, thus, to the power-take-off side. The respective torque on the power-take-off side is indicated by the reference "$M_A$."

Figure 2:
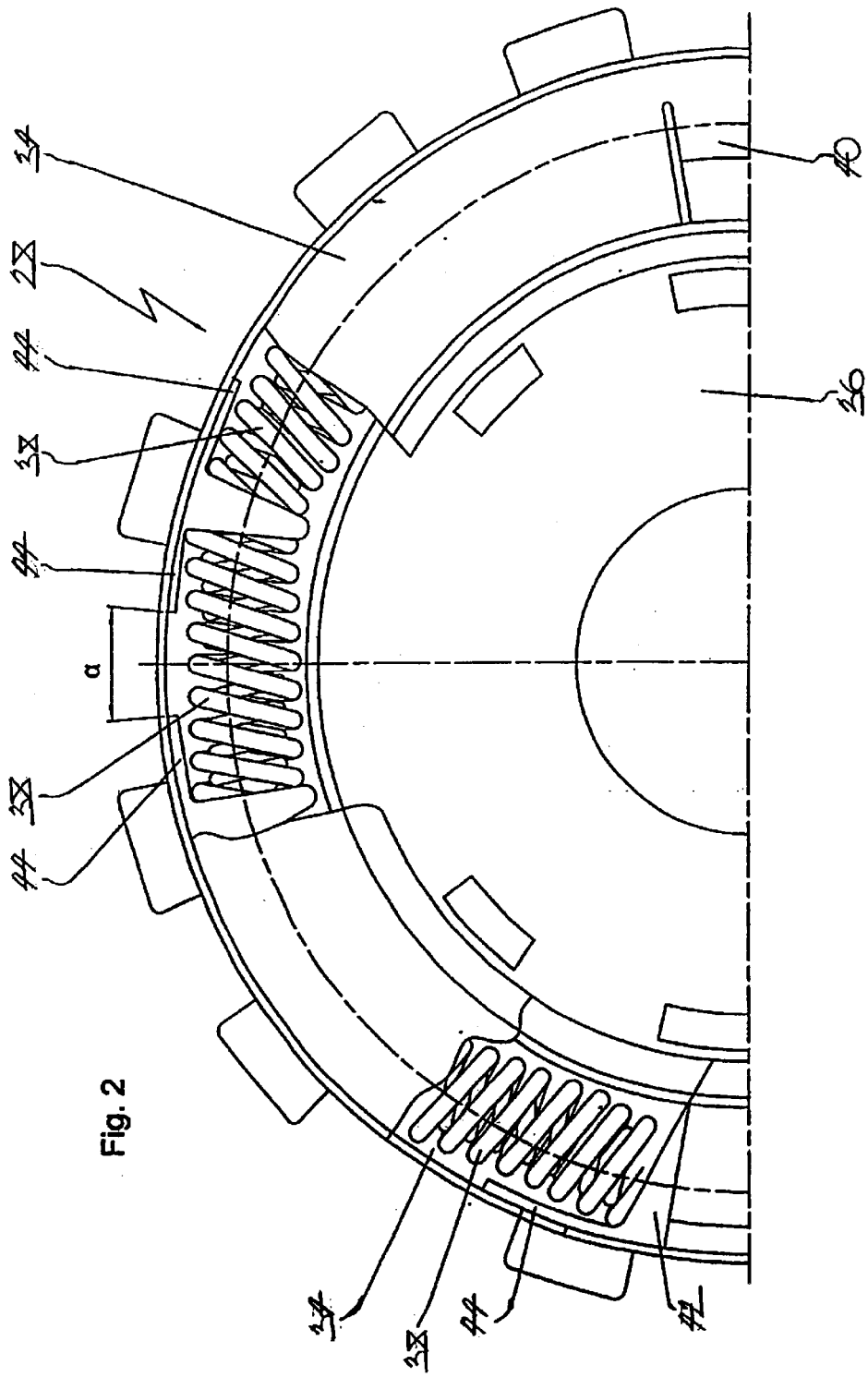
FIG. 2 is a top view of a spring device of a first embodiment of a torsional-vibration damper of the present invention as shown in FIG. 1 from level "A."
Figure 3:
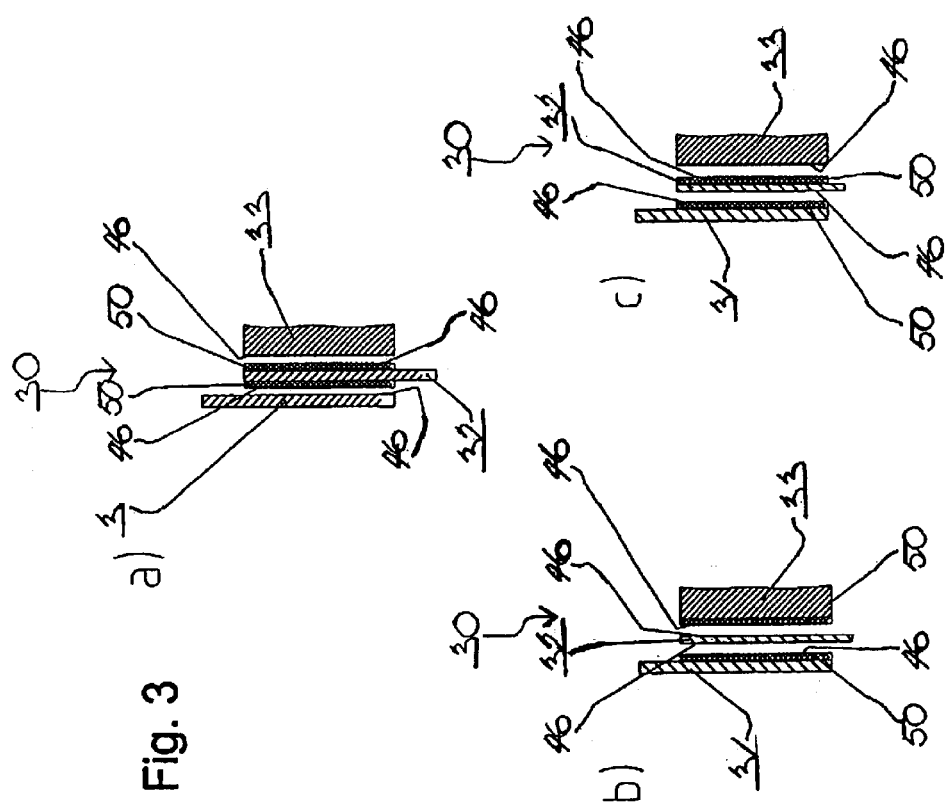
FIG. 3a is a side view of a first variant of a friction device of a first embodiment of a torsional-vibration damper of the present invention as shown in FIG. 1 in the area of section "X" illustrating a center element of the friction device having a friction coating on both sides of the center element.
FIG. 3b is a side view of a second variant of a friction device of a first embodiment of a torsional-vibration damper of the present invention as shown in FIG. 1 in the area of section "X" illustrating both left and right elements of the friction device having one friction coating on each of the left and right elements.
FIG. 3c is a side view of a third variant of a friction device of a first embodiment of a torsional-vibration damper of the present invention as shown in FIG. 1 in the area of section "X" illustrating both left and center elements of the friction device having one friction coating on each of the left and center elements.

Referring to FIGS. 1 through 4b, the first embodiment of the torsional-vibration damper 12 generally includes at least one primary element 18 and a secondary element 24. A spring device, generally indicated at 28 and shown in FIG. 2, is adapted to couple the at least one primary element 18 and the secondary element 24 to each other. The at least one primary element 18 and the secondary element 24 are limited in movement in relation to each other about a rotational axis indicated by the reference "R." A friction device, generally indicated at 30 and shown in FIG. 3, is adapted to bring the at least one primary element 18 and the secondary element 24 into frictional contact with each other and includes at least two friction-surface-carrying elements 31, 32, 33 rubbing against each other. A force-generating device, generally indicated at 51, is adapted to generate a contact-pressure force to be applied to the at least two elements 31, 32, 33 to produce a frictional engagement therebetween. The force-generating device 51 includes a mechanical actuating mechanism 52 for generating an actuating force and a hydraulic actuating mechanism, generally indicated at 53, for generating a counterforce. The contact-pressure force is a vector sum of the actuating force and the counterforce.

More specifically and referring to FIG. 1, the primary element 18 is bell-shaped and, by way of example, is fixedly connected to the flange 14 on the driving side for rotation therewith via an intermediate flange 20. A centering pin 22 centers the primary element 18 with relation to the flange 14 on the driving side. The secondary element 24, also bell-shaped, can be fixedly connected to the shaft 16 on the power-take-off side for rotation therewith via, for example, a multiple-disc clutch 26. The spring device 28 acts to limit movement of the primary element 18 and the secondary element 24 in relation to each other about the rotational axis "R." The spring device 28 is described in greater detail below. The friction device 30 includes three friction-surface-carrying elements 31, 32, 33 rubbing against each other and by which the primary element 18 and the secondary element 24 can be brought into frictional contact with each other. The friction device 30 is described in greater detail below.

The spring device 28 is configured in a commonly known manner. As shown in FIGS. 1 and 2, the spring device 28 includes two ring-shaped lateral discs 34, each of which has an indentation that is U-shaped in the circumferential direction. The lateral discs 34 are joined on the outside circumference and fixedly connected to the primary element 18 for rotation therewith. Furthermore, a substantially ring-shaped center disc 36 is disposed between the two lateral discs 34. The center disc 36 is connected to the shaft 16 on the power-take-off side by the multiple-disc clutch 26, which is described below in detail.

A plurality of spring sets 38 are disposed in the space formed by the two indentations between the two lateral discs 34. Three of the spring sets 38 are shown as examples in FIG. 2. The spring sets 38 are arranged to form a circle coaxial with the rotational axis "R".

Single spring sets 38 or multiple spring sets 38 disposed in a row are fixedly connected on one side to the lateral discs 34 and on the other side to the center disc 36 to be rotatable with the primary element 18 by the lateral discs 34. On the other side, a fixed connection for rotation with the shaft 16 can be produced by the center disc 36 and the multiple-disc clutch 26. By way of example and as shown in FIG. 2, a coupling element 40 for the primary element 18 is disposed on one side, and a coupling element 42 for the secondary element 24 is disposed on the other side of the spring device 28. Between the coupling elements 40, 42, so-called spacers 44 are disposed, which limit the maximum compression of the spring sets 38. Therefore, the torsional of the lateral discs 34 with relation to the center disc 36 is limited to a maximum angle of rotation of "N×α," where "N" reflects the number of spring sets 38 and "α" indicates the angle of rotation that is possible by compressing one single spring set 38.

The friction device 30 is disposed adjacent the spring device 28 in an axial direction. As shown in FIG. 3, the friction device 30 consists of the three elements 31, 32, 33 having friction surfaces 46 on which the elements 31, 32, 33 join each other. The elements 31, 32, 33 are ring-shaped, and the central axis is defined by the rotational axis "R."

More specifically, element 31—which is referred to below as the left element 31—has one friction surface 46, as also shown in FIG. 1, and is fixedly connected to the primary element 18 for rotation therewith by a suitable screw connection. Element 32—which is adjacent the left element 31 and referred to below as the center element 32—has two friction surfaces 46 and is fixedly mounted to the secondary element 24 for rotation therewith, similar to the center disc 36, but mounted on the outside circumference of the secondary element 24 to be axially displaceable. The center element 32 can be coupled to the shaft 16 by the coupling device 26, and when an actuating cylinder 48 is firmly engaged, the center element 32 is fixedly connected to the shaft 16 for rotation therewith. Element 33—which joins the center element 32 on the other side thereof and is referred to below as the right element 33—has one friction surface 46 and is a component of the primary element 18 and, therefore, rigidly connected with the primary element 18. The elements 31, 32, 33 are disposed adjacent each other. The respective friction surfaces 46 are facing each other so that they can be brought into frictional contact with each other.

FIG. 3 shows variants of the friction device 30 that differ in the configuration of each of the elements 31, 32, 33. More specifically, in the variant of the friction device 30 according to FIG. 3a, the center element 32 has friction coatings 50 on both faces thereof. In contrast, the faces of the two other elements 31, 33 have no friction coatings 50. The friction surfaces 46 of the center element 32 are formed by the exposed surfaces of the friction coatings 50. The friction surfaces 46 of the left and right elements 31, 33, respectively, are formed directly by the exposed surfaces thereof.

In the variant of the friction device 30 according to FIG. 3b, the two faces of the center element 32 have no friction coatings 50. In contrast, the faces of the two other elements 31, 33 have friction coatings 50. The friction surfaces 46 of the center element 32 are formed directly by the exposed surfaces thereof. In contrast, the friction surfaces 46 of the left and right elements 31, 33, respectively, are formed by the exposed surfaces of the friction coatings 50.

In the variant of the friction device 30 according to FIG. 3c, the face of the right element 33 does not have a friction coating 50. In contrast, one of the faces of each of the two other elements 31, 32 has a friction coating 50. The friction surface 46 of the right element 33 is formed by the exposed surfaces thereof. This applies similarly to the friction surface 46 of the center element 32. In contrast, the friction surfaces 46 of the left and center elements 31, 32, respectively, are formed by the exposed surfaces of the friction coatings 50.

Of course, it is also possible that the friction surfaces 46 of adjacent elements 31, 32, 33 are formed by the coating surfaces of respective friction coatings 50. The left element 31 and the center element 32 are mounted so as to be displaceable in an axial direction. The right element 33 is not axially displaceable.

The left element 31 is held pressed against the center element 32 in an axial direction by the mechanical actuating mechanism, such as a plurality of helical springs 52, as shown in FIG. 1, preferably disposed at a constant distance from each other in the circumferential direction. The springs 52, held by respective holding devices on one side, are supported by the primary element 18. As a result of contact-pressure force produced by the springs 52, a frictional engagement is produced between adjacent elements 31, 32, and 33. The rotational mobility of the primary element 18 relative to the secondary element 24 is dampened by this frictional engagement. Similarly, the rotational mobility of the secondary element 24 relative to the primary element 18 is also dampened in this way.

A ring-shaped piston element 54 is disposed on the outside circumference of the left element 31 on the side of the friction surface and opposite the spring elements 52. Those having ordinary skill in the art will appreciate that multiple smaller, cylindrical piston elements 54 can also be disposed on the circumference.

The piston element 54 (or the multiple piston elements 54, if applicable) is a component of the hydraulic actuating mechanism 53 for generating a counterforce acting against the actuating force produced by the spring elements 52. The counterforce is able to reduce the frictional engagement acting between the elements 31, 32, 33 or the frictional force of the elements 31, 32, 33 working against each other.

Therefore, based on a substantially constant contact-pressure force produced by the spring elements 52, the damping effect can be specifically reduced by hydraulically disengaging the elements 31, 32, 33 that are in frictional contact with each other.

By way of example, the wet-running multiple-disc clutch 26 includes a plurality of discs 56. A first group of discs 56 is fixedly mounted to a disc carrier 58 so that they rotate therewith. A second group of discs is fixedly mounted to a hub 60 so that they rotate therewith. The discs 56 of each of the two groups engage in the manner of a tooth system. Both groups are preferably axially displaceable in relation to each other and can be brought into friction-engaging contact in pairs by the actuating piston 48. In turn, the actuating piston 48 is responsive to a pressure medium applied via a channel 62. In view of the variants of the first embodiment of the torsional-vibration damper 12, reference is made by way of example to published German patent applications DE 31 18 565 A1 and DE 35 32 759 C1 or the like.

The disc carrier 58, frequently referred to as the "outside disc carrier," is fixedly mounted to the shaft 16 on the power-take-off side for rotation therewith. The hub 60, frequently referred to as the "inside disc carrier," is fixedly connected to the center disc 36 of the spring device 28 and to the center element 32 of the friction device 30 so that when the multiple-disc clutch 26 is closed, the shaft 16 on the power-take-off side and the secondary element 24 are coupled together.

As described in detail above and shown in FIG. 1, this variant of the first embodiment of the torsional-vibration damper 12 combines a multiple-disc clutch 26 and a friction device 30. The multiple-disc clutch 26 is open when no pressure medium is applied to the actuating piston 48 (a "normally open" clutch 26). The friction device 30 is closed when no pressure medium is applied to the piston elements 54 on account of the spring force of the spring elements 52 (a "normally closed" friction device 30). The actuating piston 48 and the piston element 54 (or piston elements 54, if applicable) are then connected via the channel 62 and a channel 64 to a same pressure-medium chamber 66 so that an increase in pressure of the medium in the pressure-medium chamber 66 will both actuate the actuating piston 34 of the multiple-disc clutch 26 and actuate the piston elements 54 of the friction device 30. The functional method of the first embodiment of the torsional-vibration damper 12 illustrated in FIG. 1 is explained below.

FIG. 4a shows a comparison between the transmission behavior of a conventional torsional-vibration damper "(A)" and the torsional-vibration damper 12 "(B)," including the friction device 30 and multiple-disc clutch 26. For the analysis below, it should be assumed, by way of example, that a rotational speed "$\omega$" between 0 and 1800 rpm is applied on the driving side to the conventional torsional-vibration damper "A" and to the torsional-vibration damper 12 "(B)." In addition, both the conventional torsional-vibration damper "A" and the torsional-vibration damper 12 "(B)" are caused to vibrate. A vibration cycle of 100 ms is assumed, for example.

As a result of the variation in the input rotational speed "$\omega$," the conventional torsional-vibration damper "A" is activated quasi-resonant at an average rotational speed "$\omega_0$" of 600 rpm. To ensure adequate decoupling between the primary side and the secondary side at higher rotational speeds "$\omega$," the damping friction must not be very high. This leads to high excess torsional vibrations on the secondary side in the resonance range compared to the primary side.

In contrast, the torsional-vibration damper 12 "B" according to FIGS. 1 to 3 experiences virtually no resonant activation, as shown in FIG. 4a. In the low-rotational-speed range "$\omega<\omega_0$" on the power-take-off side, the torsional-vibration damper 12 "B" largely follows the rotational speed "$\omega$" on the driving side because of the higher damping effect of the friction device 30—which is connected in parallel with the spring device 28—compared to the conventional torsional-vibration damper "A." In the high-rotational-speed range "$\omega>\omega_0$," the output-speed variation largely disappears both in the conventional torsional-vibration damper "A" and the torsional-vibration damper 12 "B" because, then, the damping effect of the spring device 28 is low and it is substantially damping alone.

The reason for the change in the damping behavior is shown in FIG. 4b, where the ratio between the contact-pressure force and the spring force is shown over the normalized rotational speed "$\omega_0$" and the ratio between the counterforce and the spring force of the torsional-vibration damper 12 "B" is shown. In the low-rotational-speed range "$\omega<\omega_0$," the contact-pressure force produced by the actuating force of the spring elements 52 acts on the elements 31, 32, 33 rubbing against each other to result in high damping (friction device 30 closed, multiple-disc clutch 26 open). In the high-rotational-speed range "$\omega>\omega_0$," the contact-pressure force is reduced because of the counterforce of the piston elements 54 (friction device 30 open, multiple-disc clutch 26 closed), and the spring device 28 is damping virtually alone.

Although this variant of the first embodiment of the torsional-vibration damper 12 is based on a "normally open" clutch 26 and a "normally closed" friction device 30, those having ordinary skill in the art will appreciate that, especially for aspects of energy, it is also possible to combine a "normally closed" clutch 26 (which is closed by a spring force and opened by hydraulic pressure, for example) with a "normally open" friction device 30 (which is opened by a spring force and closed by hydraulic pressure, for example).

Figure 5:
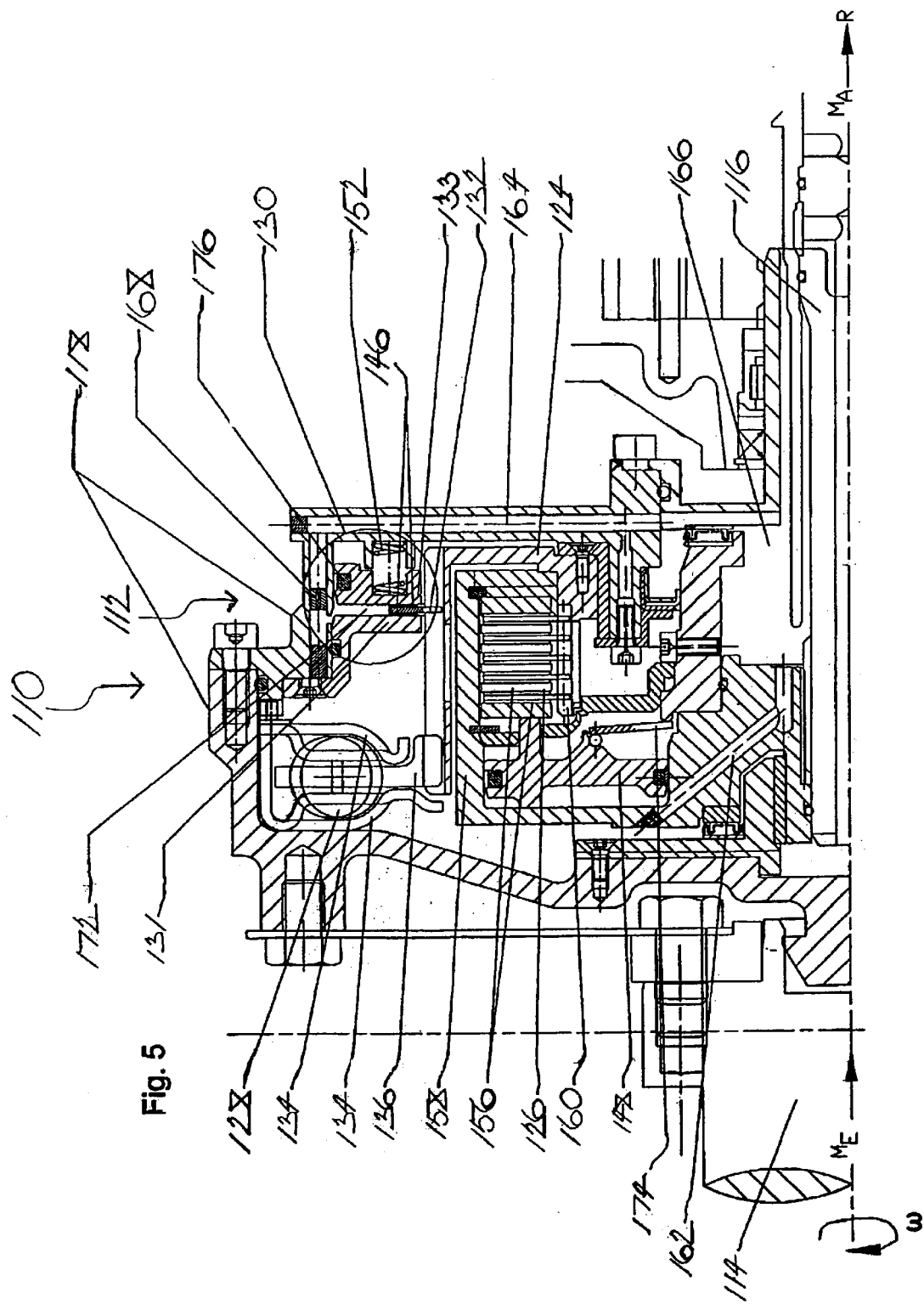
FIG. 5 is an axial profile of a section of a second exemplary drivetrain of a motor vehicle showing a second embodiment of a torsional-vibration damper of the present invention.

Referring now to FIG. 5, where like numerals increased by 100 are used to designate structure like that of FIGS. 1–3b, a section of a second exemplary drivetrain of a motor vehicle is generally indicated at 110 and illustrates a possible basic structure and functional method of a second embodiment of a torsional-vibration damper of the present invention, generally indicated at 112. In general, a flange 114 represents the driving side of the drive train 110 and is operatively coupled to, for example, an internal-combustion engine, a motor, or the like. A shaft 116 represents the power-take-off side of the drive train 110 and is operatively coupled to, for example, a transmission (not shown) or the like. The torsional-vibration damper 112 is disposed between the driving side and the power-take-off side and, thus, the flange 114 and the shaft 116. Consequently, a torque "$M_E$" introduced on the driving side by rotational speed "$\omega$" via the flange 114 can be transmitted via the torsional-vibration damper 112 to the shaft 116 and, thus, to the power-take-off side. The respective torque on the power-take-off side is indicated by the reference "$M_A$."

The second embodiment of the torsional-vibration damper 112 generally includes at least one primary element 118 and a secondary element 124. A spring device, generally indicated at 128, is adapted to couple the at least one primary element 118 and the secondary element 124 to each other. The at least one primary element 118 and the secondary element 124 are limited in movement in relation to each other about a rotational axis indicated by the reference "R." A friction device, generally indicated at 130, is adapted to bring the at least one primary element 118 and the secondary element 124 into frictional contact with each other and includes at least two friction-surface-carrying elements 131, 132, 133 rubbing against each other. A force-generating device, generally indicated at 151, is adapted to generate a contact-pressure force to be applied to the at least two elements 131, 132, 133 to produce a frictional engagement therebetween. The force-generating device 151 includes a mechanical actuating mechanism 152 for generating an actuating force and a hydraulic actuating mechanism, generally indicated at 153, for generating a counterforce. The contact-pressure force is a vector sum of the actuating force and the counterforce.

More specifically and still referring to FIG. 5, the primary element 118 is on the driving side and bell-shaped. The secondary element 124 is bell-shaped and can be connected on the power-take-off side via, for example, a multiple-disc clutch 126. The spring device 128 acts to limit movement of the primary element 118 and the secondary element 124 in relation to each other about the rotational axis "R." The spring device 128 is described in greater detail below. The friction device 130 includes three friction-surface-carrying elements 131, 132, 133 rubbing against each other and by which the primary element 118 and the secondary element 124 can be brought into frictional contact with each other. The friction device 30 is described in greater detail below.

The spring device 128 is configured in a commonly known manner. As shown in FIG. 5, the spring device 128 includes two ring-shaped lateral discs 134, each of which has an indentation that is U-shaped in the circumferential direction. The lateral discs 134 are joined on the outside circumference and fixedly connected to the primary element 118 for rotation therewith. Furthermore, a substantially ring-shaped center disc 136 is disposed between the two lateral discs 134. The center disc 136 is connected to the shaft 116 on the power-take-off side by the multiple-disc clutch 126, which is described below in detail.

A plurality of spring sets 138 are disposed in the space formed by the two indentations between the two lateral discs 134. The spring sets 138 are arranged to form a circle coaxial with the rotational axis "R."

Single spring sets 138 or multiple spring sets 138 disposed in a row are fixedly connected on one side to the lateral discs 134 and on the other side to the center disc 136 to be rotatable with the primary element 118 by the lateral discs 134. On the other side, a fixed connection for rotation with the shaft 116 can be produced by the center disc 136 and the multiple-disc clutch 126.

The friction device 130 is disposed adjacent the spring device 128 in an axial direction. The friction device 130 consists of the three elements 131, 132, 133 that are ring-shaped, and the central axis is defined by the rotational axis "R."

More specifically, element 131—which is referred to below as the left element 131—is fixedly connected to the primary element 118 for rotation therewith by a suitable screw connection. Element 132—which is adjacent the left element 131 and referred to below as the center element 132—is fixedly mounted to the secondary element 124 for rotation therewith, but mounted on the outside circumference of the secondary element 124 to be axially displaceable. The center element 132 and the center disc 136 are connected to the shaft 116 via the multiple-disk clutch 126. Element 133—which joins the center element 132 and is referred to below as the right element 133—is connected with the primary element 118 to be axially displaceable by coupling the mechanical actuating mechanism, such as several helical springs 152.

The center element 132 and the right element 133 are mounted so as to be displaceable in an axial direction. The left element 131 is not axially displaceable. The elements 131, 132, 133 are disposed adjacent each other and have respective friction surfaces 146 that are facing each other so that they can be brought into frictional contact with each other.

The right element 133 is held pressed against the center element 132 in an axial direction by the plurality of springs 152, preferably disposed at a constant distance from each other in the circumferential direction. The springs 152, held on one side by respective holding devices, are supported by the primary element 118. As a result of a contact-pressure force produced by the springs 152, a frictional engagement is produced between the elements 131, 132, 133. The rotational mobility of the primary element 118 relative to the secondary element 124 is dampened by this frictional engagement. Similarly, the rotational mobility of the secondary element 124 relative to the primary element 118 is also dampened in this way.

A pressure-medium chamber 172 is disposed between the left element 131 and the displaceable right element 133. The pressure-medium chamber 172 is a component of the hydraulic actuating mechanism 153. A pressure medium can be applied to the pressure-medium chamber 172. Applying the pressure medium causes an overpressure in the pressure-medium chamber 172 formed by elements 131, 133, by which the right element 133 is displaced against an actuating force produced by a spring force of the springs 152.

In this variant of the second embodiment of the torsional-vibration damper 112, the friction surfaces 146 of the elements 131, 132, 133 rubbing against each other when in engagement act as sealing surfaces in that they delimit the pressure-medium chamber 172 with at least one outside surface of the friction surfaces 146. Applying the pressure medium to the pressure-medium chamber 172, however, not only causes adjacent elements 131, 132, 133 to separate, but also causes the pressure-medium chamber 172 to open to the surroundings. To limit any related loss of the pressure medium, a flow-control device 168 in a channel 162 prevents, or at least restricts, outflow of the pressure medium through the adjacent disengaged elements 131, 132, 133.

The wet-running multiple-disc clutch 126 includes a plurality of discs 156. A first group of discs 156 is fixedly mounted to an outside disc carrier 158 so that they rotate therewith. A second group of discs 156 is fixedly mounted with an inside disc carrier 160 so that they rotate therewith. The discs 156 of each of the two groups engage in the manner of a tooth system. Both groups are axially displaceable in relation to each other and, in this manner, can be brought into frictionally engaged contact in pairs. Again, the outside disc carrier 158 is fixedly mounted to the shaft 116 on the power-take-off side for rotation therewith. The inside disc carrier 160 is fixedly connected to the center disc 136 of the spring device 128 and to the second element 132 of the friction device 130 so that when the multiple-disc clutch 126 is closed, the shaft 116 on the power-take-off side and the secondary element 124 are coupled together.

As described in detail above and shown in FIG. 5, this variant of the second embodiment of the torsional-vibration damper 112 combines a "normally open" multiple-disc clutch 126 and a "normally closed" friction device 130. An actuating piston 148 and the pressure-medium chamber 172 are connected to a same pressure-medium chamber 166 via a channel 164 and the channel 162 so that an increase in pressure of the medium in the pressure-medium chamber 166 both actuates the actuating piston 148 of the multiple-disc clutch 126 against the spring force of a disc spring 174 and axially displaces the right element 133 of the friction device 130. The friction device 130 is sealed against its surroundings by an elastic sealing device 176 against the spring force of the springs 152.

Figure 6:
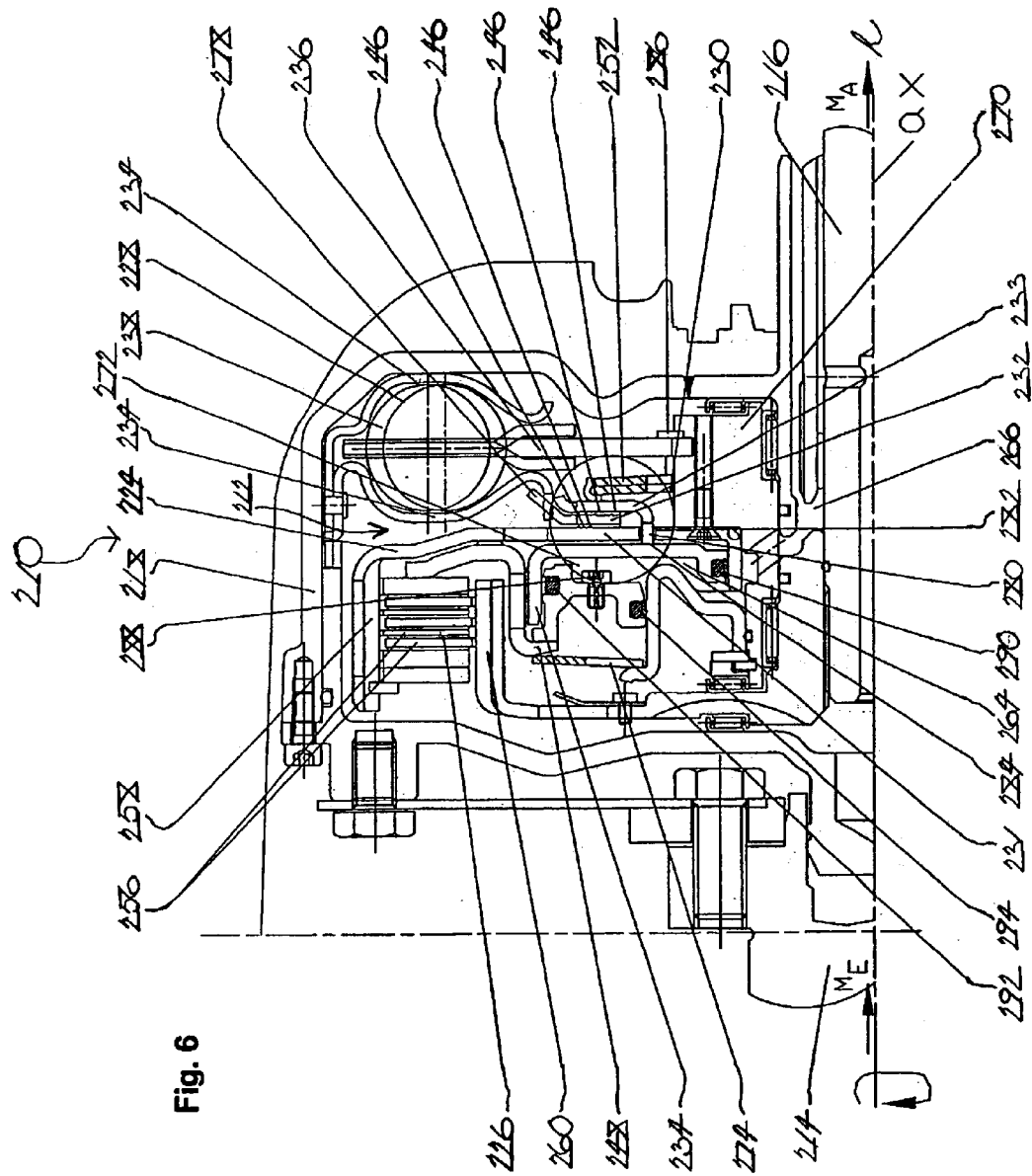
FIG. 6 is an axial profile of a section of a third exemplary drivetrain of a motor vehicle showing a third embodiment of a torsional-vibration damper of the present invention.

Referring now to FIG. 6, where like numerals increased by 200 are used to designate structure like that of FIGS. 1–3b, a section of a third exemplary drivetrain of a motor vehicle is generally indicated at 210 and illustrates a possible basic structure and functional method of a second embodiment of a torsional-vibration damper of the present invention, generally indicated at 212. In general, a flange 214 represents the driving side of the drive train 210 and is operatively coupled to, for example, an internal-combustion engine, a motor, or the like. A shaft 216 represents the power-take-off side of the drive train 210 and is operatively coupled to, for example, a transmission (not shown) or the like. The torsional-vibration damper 212 is disposed between the driving side and the power-take-off side and, thus, the flange 214 and the shaft 216. Consequently, a torque "$M_E$" introduced on the driving side by rotational speed "ω" via the flange 214 can be transmitted via the torsional-vibration damper 212 to the shaft 216 and, thus, to the power-take-off side. The respective torque on the power-take-off side is indicated by the reference "$M_A$."

The third embodiment of the torsional-vibration damper 212 generally includes at least one primary element 218 and a secondary element 224. A spring device, generally indicated at 228, is adapted to couple the at least one primary element 218 and the secondary element 224 to each other. The at least one primary element 218 and the secondary element 224 are limited in movement in relation to each other about a rotational axis indicated by the reference "R." A friction device, generally indicated at 230, is adapted to bring the at least one primary element 218 and the secondary element 224 into frictional contact with each other and includes at least two friction-surface-carrying elements 231, 232, 233 rubbing against each other. A force-generating device, generally indicated at 251, is adapted to generate a contact-pressure force to be applied to the at least two elements 231, 232, 233 to produce a frictional engagement therebetween. The force-generating device 251 includes a mechanical actuating mechanism 252 for generating an actuating force and a hydraulic actuating mechanism, generally indicated at 253, for generating a counterforce. The contact-pressure force is a vector sum of the actuating force and the counterforce.

More specifically and still referring to FIG. 6, the primary element 218 is on the driving side and bell-shaped. The secondary element 224 can be connected to the shaft 216 via, for example, a multiple-disc clutch 226. The spring device 228 couples the primary element 218 and the secondary element 224 to each other to be resilient. The spring device 228 acts to limit movement of the primary element 218 and the secondary element 224 in relation to each other about the rotational axis "R." The spring device 228 is described in greater detail below. The friction device 230 includes three friction-surface-carrying elements 231, 232, 233 having friction surfaces 246 and rubbing against each other. The friction device 230 damps rotational mobility of the secondary element 224 relative to the primary element 218 when required. The friction device 230 is described in greater detail below.

The spring device 228 is configured in a commonly known manner. As shown in FIG. 6, the spring device 228 includes two ring-shaped lateral discs 234, each of which has an indentation that is U-shaped in the circumferential direction. The lateral discs 234 are joined on the outside circumference and connected to the primary element 218 for rotation therewith. Furthermore, a substantially ring-shaped center disc 236 is disposed between the two lateral discs 234. The center disc 236 is mounted to the secondary element 224 by a screw connection.

A plurality of spring sets 238 are disposed in the space formed by the two indentations between the two lateral discs 234. The spring sets 238 are disposed in a row and coaxial relative to the rotational axis "R." Single spring sets 238 or several spring sets 238 disposed in a row are connected as shown in FIG. 2 to the lateral discs 234 on one side and to the center disc 236 on the other side to produce an elastic spring coupling between the primary element 218 connected to the shaft 216 via the flange 214 and the secondary element 224. The secondary element 224 can be coupled to the shaft 216 on the power-take-off side via the multiple-disc coupling 226.

The friction device 230 is disposed adjacent the center disc 236 of the spring device 228 in an axial direction. Consequently, the friction device 230 consists of three elements 231, 232, 233, each of which has at least one friction surface 246. The elements 231, 232, 233 are configured substantially ring-shaped and disposed coaxially relative to the rotational axis "R" and adjacent each other.

The left element 231 is an integral component of the secondary element 224. The center element 232, disposed adjacent the left element 231, is connected with a transitional part 278 radially projecting outward to be displaceable in an axial direction "ax," but rotatable with the lateral disc 234, which is rigidly coupled to the primary element 218. The axially displaceable right element 233, disposed adjacent the center element 232, has on the inside circumference of the right element 233 various finger-like transitional parts 280 projecting in an axial direction. The transitional parts 280 are guided through axially extending openings 282 in the secondary element 224. Faces 284 of the transitional parts 280 are supported by a hydraulic actuating piston 234 that is displaceable in the axial direction "ax."

The exposed ring area of the right element 233 is axially supported by the mechanical actuating mechanism, such as a disc-spring set 252 supported in the axial direction "ax" by the center disc 236 and having the form of two layered disc springs 252 (if necessary, a single disc spring 252 may also be used). The center disc 236 is axially held by a securing ring 286 that closes the axial power flux via a hub 270 with the secondary element 224, which is screwed on there.

The three adjacent elements 231, 232, 233 have facing friction surfaces 246 that can be brought into frictional contact with each other. To a person skilled in the art, it is understood that the respective friction surfaces 246 can also be formed by the surfaces of friction coatings applied to the elements 231, 232, 233. The right element 233 is held pressed against the center element 232 in an axial direction by the disc spring 252. Contact-pressure force produced by the disc-spring set 252 produces a frictional engagement between the elements 231, 232, 233. This frictional engagement dampens rotational mobility of the primary element 218 relative to the secondary element 224. Similarly, this frictional engagement dampens rotational mobility of the secondary element 224 relative to the primary element 218.

The wet-running (coolant supply via a helical restrictor 288 from the pressure-medium chamber 272) multiple-disc clutch 226 includes a plurality of discs 256. A first group of discs 256 is fixedly mounted to the outside disc carrier 258 so that they rotate therewith. A second group of discs 256 is fixedly mounted to the inside disc carrier 260 so that they rotate therewith. The discs 256 of each of the two groups engage in the manner of a tooth system. Both groups are axially displaceable in relation to each other and can be brought into frictionally engaging contact in pairs by a hydraulic actuating piston 248 acting against the pressure of a disc spring 274.

The outside disc carrier 258 is an integral component of the secondary element 224. The inside disc carrier 260 is fixedly connected to the shaft 216 on the power-take-off side for rotation therewith. Therefore, when the multiple-disc clutch 226 is closed, the secondary element 224 and the power-take-off shaft 216 are coupled together.

The hydraulic actuating piston 248 of the multiple-disc clutch 226 and the hydraulic actuating piston 234 of the friction device 230 substantially encompass a common pressure-medium chamber 272. The hydraulic actuating piston 234 of the friction device 230 is axially displaceable and sealed by an elastic sealing device 290 against the surroundings on the secondary element 224 and sealed by an elastic sealing device 292 against the surroundings on the hydraulic actuating piston 248 of the multiple-disc clutch 226. The hydraulic actuating piston 248 of the multiple-disc clutch 226 is also axially displaceable and sealed on one side by the elastic sealing device 292 against the surroundings on the hydraulic actuating piston 234 of the friction device 230 and on the other side by an elastic sealing device 294 against the surroundings on the secondary element 224.

The torsional-vibration damper 212 has an especially compact form because the hydraulic actuating piston 248 of the multiple-disc clutch 226 and the hydraulic actuating mechanism 253—the hydraulic actuating mechanism 234 of the friction device 230—are using a common pressure-medium chamber 272. In this respect, it should be noted that the hydraulic actuating piston 248 of the multiple-disc clutch 226 could also be a component of the hydraulic actuating device 234 of the friction device 230. This would not change the functional method of the torsional-vibration damper 212, but would offer the advantages of it having fewer movable components and being even more compact.

As described in detail above and shown in FIG. 6, this variant of the third embodiment of the torsional-vibration damper 212 combines a "normally open" multiple-disc clutch 226 with a "normally closed" friction device 230. An increase in pressure of the medium in the pressure-medium chamber 272 via a channel 264 from a pressure-medium chamber 266 actuates the actuating piston 248 of the multiple-disc clutch 226 against the spring force of the disc spring 274 supported by the secondary element 224 (multiple-disc clutch 226 closing). Such an increase also actuates the actuating piston 234 of the friction device 230 against the spring force of the disc spring 252 supported by the center disc 236 and, thus, the secondary element 224 (which means reducing the contact-pressure force acting on the elements 231, 232, 233 and, thus, opening the friction device 230).

The control system of the torsional-vibration damper 12, 112, 212 for providing a controlled moment of friction in the friction device 30, 130, 230 is not too expensive. Also, the control system of the torsional-vibration damper 12, 112, 212 for the damping effect of the friction device 30, 130, 230 can be produced cost-effectively and is easily controllable. And, the control system of the torsional-vibration damper 12, 112, 212 for controlling and adjusting the frictional engagement of the at least two elements 31, 32, 33, 131, 132, 133, 231, 232, 233 rubbing against each other is a simpler arrangement. Further, variability of the damping effect of the frictional contact is achieved. In addition, the torsional-vibration damper 12, 112, 212 requires few separate components, and no additional pressure-medium-supplying devices are needed.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A torsional-vibration damper comprising:
   at least one primary element;
   a secondary element;
   a spring device adapted to couple said at least one primary element and said secondary element to each other, said at least one primary element and said secondary element being limited in movement in relation to each other about a rotational axis;
   a friction device adapted to bring said at least one primary element and said secondary element into frictional contact with each other and including at least two friction-surface-carrying elements rubbing against each other; and
   a force-generating device adapted to generate a contact-pressure force to be applied to said at least two elements to produce a frictional engagement therebetween, said force-generating device including a mechanical actuating mechanism for generating an actuating force and a hydraulic actuating mechanism for generating a counterforce, wherein the contact-pressure force is a vector sum of said actuating force and said counterforce.

2. A torsional-vibration damper as set forth in claim 1, wherein said mechanical actuating mechanism includes at least one spring element.

3. A torsional-vibration damper as set forth in claim 1, further including at least one of a wet-running clutch and a transmission arrangement operating by at least one of a coolant and a hydraulic fluid, said hydraulic actuating mechanism including a pressure-medium-supplying device for supplying said hydraulic actuating mechanism with a pressure medium by which said counterforce can be generated, said pressure medium being said at least one of a coolant and a hydraulic fluid.

4. A torsional-vibration damper as set forth in claim 3, wherein said pressure-medium-supplying device is a component of said at least one of a wet-running clutch and a transmission arrangement.

5. A torsional-vibration damper as set forth in claim 4, wherein said at least one of a wet-running clutch and a transmission arrangement is a multiple-disc clutch.

6. A torsional-vibration damper as set forth in claim 5, wherein said multiple-disc clutch is normally open and said friction device is normally closed.

7. A torsional-vibration damper as set forth in claim 5, wherein said multiple-disc clutch is normally closed and said friction device is normally open.

8. A torsional-vibration damper as set forth in claim 3, wherein said multiple-disc clutch includes a hydraulic actuating piston, said hydraulic actuating piston and said hydraulic actuating mechanism of said friction device substantially encompassing a common pressure-medium chamber.

9. A torsional-vibration damper as set forth in claim 8, wherein said hydraulic actuating piston of said multiple-disc clutch is a component of said hydraulic actuating mechanism of said friction device.

10. A torsional-vibration damper as set forth in claim 8, wherein said hydraulic actuating mechanism of said friction device is a component of said hydraulic actuating piston of said multiple-disc clutch.

11. A torsional-vibration damper as set forth in claim 2, wherein at least one of said at least two friction-surface-carrying elements is substantially perpendicularly displaceable relative to respective friction surfaces of at least one of adjacent said at least two friction-surface-carrying elements.

12. A torsional-vibration damper as set forth in claim 11, wherein said at least one spring element holds said at least one of said at least two friction-surface-carrying elements engaged with said at least one of adjacent said at least two friction-surface-carrying elements.

13. A torsional-vibration damper as set forth in claim 11, further including a pressure-medium chamber and wherein said hydraulic actuating mechanism further includes a piston element adjacent said pressure-medium chamber and to which a pressure medium can be applied by said pressure-medium chamber to hold said at least one of said at least two friction-surface-carrying elements disengaged from said at least one of adjacent said at least two friction-surface-carrying elements.

14. A torsional-vibration damper as set forth in claim 11, further including a pressure-medium chamber between said at least one of said at least two friction-surface-carrying elements and said at least one of adjacent said at least two friction-surface-carrying elements, where a pressure medium can be applied to said pressure-medium chamber to hold said at least one of said at least two friction-surface-carrying elements disengaged from said at least one of adjacent said at least two friction-surface-carrying elements.

15. A torsional-vibration damper as set forth in claim 14, further including a flow-control device for limiting loss of said pressure medium.

16. A torsional-vibration damper as set forth in claim 15, further including a sealing device for sealing said pressure-medium chamber.

17. A drive train of a motor vehicle, said drive train comprising:
   a flange representing the driving side of said drive train;
   a shaft representing the power-take-off side of said drive train;
   a torsional-vibration damper disposed between said flange and said shaft, wherein a torque introduced on the driving side by rotational speed via said flange can be transmitted via said torsional-vibration damper to said shaft and, thus, to the power-take-off side;
   said torsional-vibration damper including:
      at least one primary element;
      a secondary element;
      a spring device adapted to couple said at least one primary element and said secondary element to each other, said at least one primary element and said secondary element being limited in movement in relation to each other about a rotational axis;
      a friction device adapted to bring said at least one primary element and said secondary element into frictional contact with each other and including at least two friction-surface-carrying elements rubbing against each other; and
      a force-generating device adapted to generate a contact-pressure force to be applied to said at least two elements to produce a frictional engagement therebetween, said force-generating device including a mechanical actuating mechanism for generating an actuating force and a hydraulic actuating mechanism for generating a counterforce, wherein the contact-pressure force is a vector sum of said actuating force and said counterforce.

* * * * *